(12) United States Patent
Foenander et al.

(10) Patent No.: US 9,939,005 B2
(45) Date of Patent: Apr. 10, 2018

(54) METHODS AND APPARATUS FOR RETAINING A FASTENER RECEIVER

(71) Applicant: The Boeing Company, Chicago, IL (US)

(72) Inventors: Jason Jeremy Foenander, Point Cook (AU); Andrew Birch, Hampton (AU); Nicholas Garcia, Saint Charles, MO (US)

(73) Assignee: The Boeing Company, Chicago, IL (US)

( * ) Notice: Subject to any disclaimer, the term of this patent is extended or adjusted under 35 U.S.C. 154(b) by 34 days.

(21) Appl. No.: 15/189,264

(22) Filed: Jun. 22, 2016

(65) Prior Publication Data
US 2017/0370394 A1    Dec. 28, 2017

(51) Int. Cl.
| | |
|---|---|
| *F16B 37/04* | (2006.01) |
| *F16B 5/02* | (2006.01) |
| *F16B 33/00* | (2006.01) |
| *F16B 25/00* | (2006.01) |
| *B64C 3/26* | (2006.01) |
| *F16B 39/284* | (2006.01) |

(52) U.S. Cl.
CPC .............. *F16B 37/044* (2013.01); *B64C 3/26* (2013.01); *F16B 5/025* (2013.01); *F16B 25/0021* (2013.01); *F16B 33/002* (2013.01); *F16B 39/284* (2013.01)

(58) Field of Classification Search
CPC ...... F16B 37/04; F16B 37/041; F16B 37/044; F16B 37/046; F16B 39/284; F16B 5/025; F16B 25/0021; F16B 33/002; B64C 3/26

USPC .................................. 411/103, 111, 112–113
See application file for complete search history.

(56) References Cited

U.S. PATENT DOCUMENTS

| | | | | |
|---|---|---|---|---|
| 2,393,436 A | * | 1/1946 | Wallace ................ | F16B 37/044 411/106 |
| 2,409,209 A | * | 10/1946 | Johnson ................ | F16B 37/044 411/111 |
| 2,469,311 A | * | 5/1949 | Poupitch ............... | F16B 37/044 411/84 |
| 2,771,113 A | * | 11/1956 | Flora ..................... | F16B 37/041 411/167 |
| 3,219,085 A | * | 11/1965 | Zahodiakin ........... | F16B 37/044 411/112 |
| 3,219,086 A | * | 11/1965 | Zahodiakin ........... | F16B 37/044 411/112 |

(Continued)

*Primary Examiner* — Roberta S Delisle
(74) *Attorney, Agent, or Firm* — Hanley, Flight & Zimmerman, LLC (57) ABSTRACT

Methods and apparatus for retaining a fastener receiver are disclosed. An example apparatus includes a retainer to retain a nut assembly adjacent an object. The retainer includes a first plate defining a first opening. The first plate is to couple to the object. The first opening is to receive a portion of the nut assembly when the retainer is coupled to the object. The retainer includes a second plate defining a second opening and including a first deflectable tab adjacent the second opening. The second plate is to couple to the first plate opposite the object. The deflectable tab of the second plate is to cover a portion of the first opening of the first plate. The first deflectable tab is to deflect to receive and retain the portion of the nut assembly in the first opening when the retainer is coupled to the object.

20 Claims, 9 Drawing Sheets

(56) References Cited

U.S. PATENT DOCUMENTS

| | | | | | |
|---|---|---|---|---|---|
| 3,219,088 | A | * | 11/1965 | Zahodiakin | F16B 37/044 411/103 |
| 3,219,089 | A | * | 11/1965 | Zahodiakin | F16B 37/043 411/113 |
| 4,826,374 | A | * | 5/1989 | Baglin | F16B 37/044 411/103 |
| 5,137,406 | A | * | 8/1992 | Cosenza | F16L 32/005 411/113 |
| 5,193,643 | A | * | 3/1993 | McIntyre | B60G 99/00 180/312 |
| 6,261,042 | B1 | * | 7/2001 | Pratt | F16B 5/10 411/551 |
| 7,441,996 | B2 | * | 10/2008 | Odulio | B62D 24/02 411/111 |
| 7,658,579 | B1 | * | 2/2010 | Stewart | B60G 13/003 280/788 |
| 8,353,649 | B2 | * | 1/2013 | Csik | F16B 37/045 411/108 |
| 2004/0052607 | A1 | * | 3/2004 | Johnson | F16B 21/02 411/112 |
| 2009/0129885 | A1 | * | 5/2009 | Csik | F16B 37/046 411/103 |
| 2011/0311331 | A1 | * | 12/2011 | Tejero Salinero | F16B 37/02 411/175 |

* cited by examiner

METHODS AND APPARATUS FOR RETAINING A FASTENER RECEIVER

FIELD OF THE DISCLOSURE

This patent relates generally to fasteners and, more particularly, to methods and apparatus for retaining a fastener receiver.

BACKGROUND

Objects (e.g., layers of material) oftentimes are coupled together via fasteners. In some examples, a fastener (e.g., a bolt) extends through an aperture defined by the objects and is received (e.g., threadably received) by a fastener receiver (e.g., a nut) to couple the objects together. For example, a bolt and a nut may be utilized to couple together layers of an aircraft wing. In some instances, the fastener assembly includes a retainer (e.g., a blind nut retainer) coupled to a surface of one of the objects to position the nut adjacent an aperture of the objects while the bolt is inserted into the aperture to enable the nut to couple to (e.g., threadably receive) the bolt.

SUMMARY

In one example, an apparatus includes a retainer to retain a nut assembly adjacent an object. The retainer includes a first plate defining a first opening. The first plate is to couple to the object. The first opening is to receive a portion of the nut assembly when the retainer is coupled to the object. The retainer includes a second plate defining a second opening and including a first deflectable tab adjacent the second opening. The second plate is to couple to the first plate opposite the object. The deflectable tab of the second plate is to cover a portion of the first opening of the first plate. The first deflectable tab is to deflect to receive and retain the portion of the nut assembly in the first opening when the retainer is coupled to the object.

In another example, an apparatus includes a fastener receiver including a first protrusion and a retainer to retain the fastener receiver adjacent an object. The retainer includes a first portion defining a first opening. The first portion is to couple to the object. The first opening is to contain a portion of the fastener receiver when the retainer is coupled to the object. The retainer includes a second portion coupled to the first portion. The second portion defines a second opening and includes a first flexible portion that is adjacent the second opening. The first flexible portion is to deflect in a first direction to receive the first protrusion of the fastener receiver in the first opening and deflect in a second direction opposite the first direction to enable removal of the fastener receiver from the first opening.

In another example, an apparatus includes means for retaining a nut adjacent an object. The means for retaining includes means for containing the nut adjacent the object and means for deflecting coupled to the means for containing. The means for deflecting is to deflect in a first direction to enable the means for containing to receive the nut. The means for deflecting is to deflect in a second direction opposite the first direction to enable removal of the nut from the means for containing.

BRIEF DESCRIPTION OF THE DRAWINGS

The figures are not to scale. Instead, to clarify multiple layers and regions, the thicknesses of the layers may be enlarged in the drawings. Wherever possible, the same reference numbers will be used throughout the drawing(s) and accompanying written description to refer to the same or like parts.

DETAILED DESCRIPTION

Fasteners oftentimes are used to couple objects together. As used herein, objects include components, parts, layers and/or sheets of material that may be coupled together. To couple objects together, some known fasteners are inserted into an aperture defined by the objects. In some examples, the fastener (e.g., a bolt) includes a first end having a head and a second end (e.g., a threaded end). The second end is to extend through and beyond the aperture of the objects and is received (e.g., threadably received) by a nut such that the nut engages one side of the objects and the head of the fastener engages another opposing side to clamp the objects together. For example, bolts and nuts are utilized to assemble an aircraft wing by coupling together fittings, spars, and/or skin panels of a wing assembly.

In some instances, because of the location at which the fastener and the nut are positioned relative to the objects, it may be difficult for an assembler to hold the nut in place while threadably inserting the fastener into the nut and/or to hold the fastener while rotating the nut to threadably couple to the fastener. To avoid such difficulties, known nut retainers (e.g., blind nut retainers) may be utilized to hold the nut in place adjacent the aperture. For example, some known nut retainers are coupled to a surface adjacent the aperture to retain the nut adjacent the aperture to enable the nut to threadably receive the fastener.

To ensure that the nut retainer is positioned adjacent the aperture, some known nut retainers are coupled to the surface of one of the objects after the aperture is formed in the objects. For example, prior to coupling the nut retainer to the surface of the object, the objects are aligned relative to each other and the aperture is formed (e.g., drilled) in each of the objects. Subsequently, one or more of the objects are disassembled to enable an assembler to access the position at which the nut retainer is to be coupled to the surface of the object. After the known nut retainer is coupled to the surface of one of the objects, the nut is received by the nut retainer, the objects are reassembled, and the fastener is inserted into the aperture and received by the nut held by the nut retainer. Known nut retainers may include a plurality of components that are difficult to assemble with the nut adjacent the surface of the object. As a result, the use of known nut retainers to couple objects together may result in a labor intensive process and, thus, increase manufacturing time and/or costs.

The example apparatus and methods disclosed herein include a nut retainer that is coupled to a surface of an object prior to an aperture being formed in the object and/or other objects and remains coupled to the surface while the aperture is formed in the objects, thereby reducing manufacturing time and/or costs associated with coupling the objects together. The retainer of the examples disclosed herein includes a first plate (e.g., a first portion of the retainer) that is to couple to the surface of the object. The first plate defines a first opening that is to receive a portion of a nut assembly (e.g., a first portion of the nut assembly) when the retainer is coupled to the object. Further, the retainer includes a second plate (e.g., a second portion of the retainer) that defines a second opening and includes a flexible portion (e.g., a first flexible portion) adjacent the second opening. The second plate couples to the first plate opposite the object. The flexible portion of the second plate covers a portion of the first opening of the first plate when the second plate is coupled to the first plate. Further, the flexible portion deflects and/or flexes to receive and retain the portion of the nut assembly in the first opening when the retainer is coupled to the object. For example, the flexible portion deflects in a first direction (e.g., toward the object) to receive the portion of the nut assembly in the first opening and deflects in a second direction (e.g., away from the object) to enable removal of the portion of the nut assembly from the first opening. Thus, the examples disclosed herein reduce manufacturing and/or repair costs and/or time by enabling the nut assembly to be quickly and/or conveniently inserted into and/or removed from the retainer that is coupled to one of the objects.

To enable the first plate and the second plate of the retainer to couple to the surface of the object, the first and second plates define apertures (e.g., a first aperture, a second aperture, etc.) that are spaced apart from the first opening and the second opening. The apertures of the retainer are to receive fasteners that couple (e.g., via rivets and/or threaded fasteners such as bolts) to the object to couple the retainer to the surface of the object. For example, the apertures of the retainer extend parallel to a center axis of the first opening of the first plate and/or the second opening of the second plate of the retainer. Further, the fasteners enable the first plate the second plate to be removably coupled to the surface of the object to enable first plate, the second plate and/or the nut assembly retained by the retainer to be repaired and/or replaced.

In some examples, the flexible portion of the second plate includes a deflectable tab defined by a groove. The flexible portion further includes a gap defined by the groove between the deflectable tab and a body of the second portion of the retainer. The gap increases as the deflectable tab is deflected to enable the nut assembly to enter and/or be removed from the first opening of the first plate. Additionally or alternatively, the first opening of the first plate includes a cavity (e.g., a first cavity) that aligns with the flexible portion (e.g., the first flexible portion) of the second plate. The first cavity is to receive a portion of the nut assembly, and the flexible portion is to retain the portion of the nut assembly received by the first cavity. Further, the first portion includes a wall that defines the first cavity and engages the portion of the nut assembly received by the first cavity to limit rotation of the nut assembly in the retainer to enable the nut assembly to threadably receive a fastener when the nut assembly is retained by the retainer.

The nut assembly may include the first portion from which a protrusion (e.g., a first protrusion extends) and a second portion that is spaced apart from the first portion along an axis of the nut assembly. For example, the protrusion has a width greater than a width of the flexible portion of the first plate to enable the deflectable tab of the flexible portion to retain the protrusion and, thus, the first portion of the nut assembly in the first opening of the first plate. When the nut assembly is retained by the retainer, the first portion is to be disposed in the first opening of the first plate of the retainer and the second portion extends through the second opening of the second plate. For example, the first opening of the retainer is wider than the first portion of the nut assembly and the second opening of the retainer is wider than the second portion of the nut assembly to receive the nut assembly, and the first portion of the nut assembly is wider than the second opening of the retainer to retain the nut assembly.

In some examples, the second portion of the retainer includes first and second flexible portions spaced apart from each other. Further, the first portion of the retainer may include corresponding first and second cavities of the first opening, and the nut assembly may include first and second protrusions spaced apart from each other. In such examples, the first flexible portion is to flex and/or deflect to receive and retain the first protrusion of the nut assembly in the first cavity, and the second flexible portion is to flex and/or deflect to receive and retain the second protrusion of the nut assembly in the second cavity. For example, the first flexible portion includes a first deflectable tab that extends in a first direction, and the second flexible portion includes a second deflectable tab that extends in a second direction opposite the first direction. In such examples, the orientation of the first and second deflectable tabs enables the first protrusion to be rotated past the first deflectable tab into the first cavity and the second protrusion to be rotated past the second deflectable tab into the second cavity.

Further, the first opening and the second opening of the examples disclosed herein are wider than a tool (e.g., a drill) that is used to form the aperture through the objects to be coupled. As a result, when the aperture is being formed through the objects, the retainer remains coupled to the object such that the tool may extend through the first and second openings of the retainer without contacting and/or otherwise damaging the retainer. Thus, because the example retainers disclosed herein remain coupled to one of the objects throughout the coupling process, the example retainers disclosed herein reduce manufacturing time and/or costs.

Figure 1:
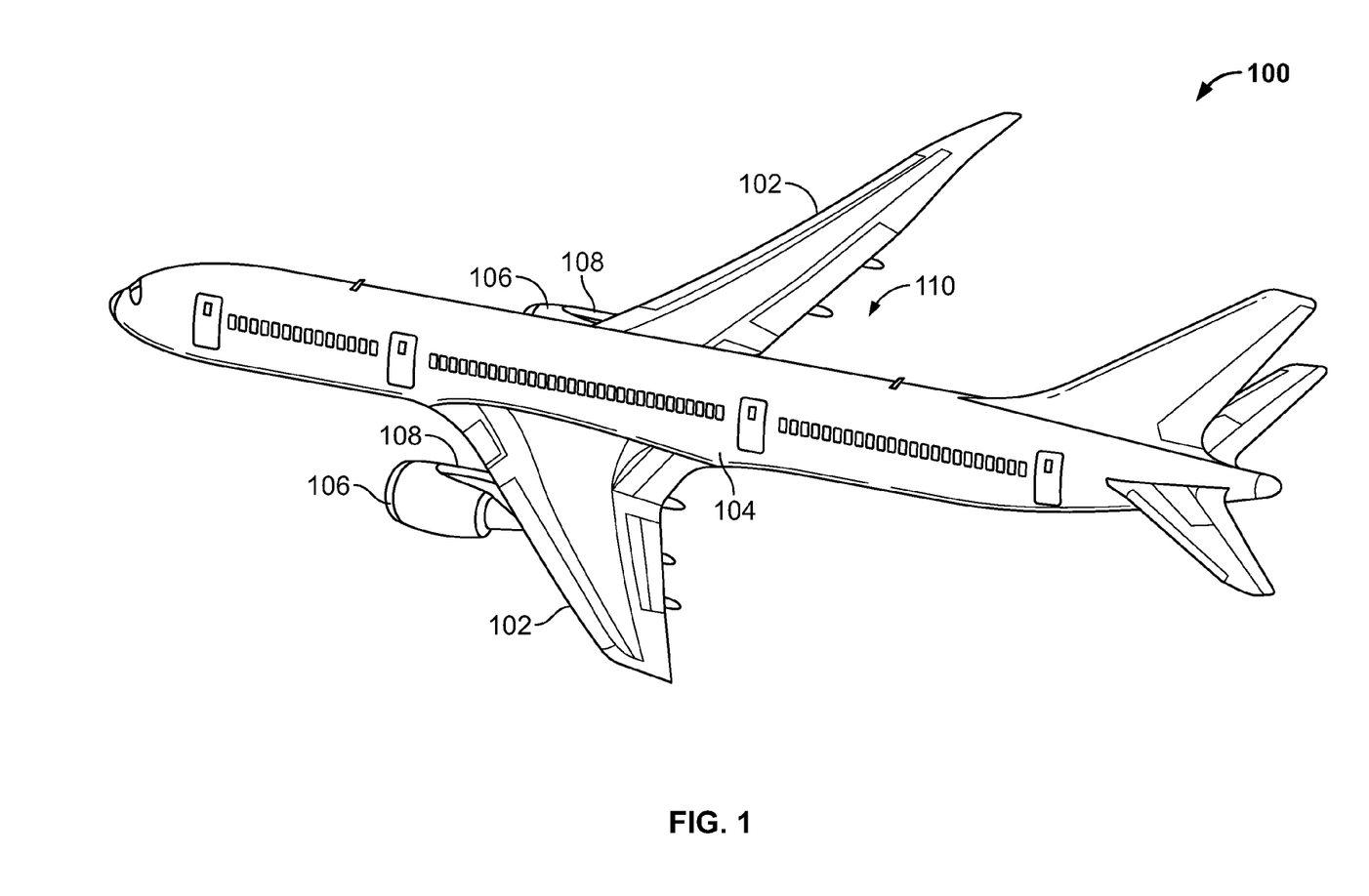
FIG. 1 depicts an example aircraft in accordance with the teachings herein.

Turning to the figures, FIG. 1 illustrates an example aircraft 100 including wings 102 (e.g., a right wing and a left wing) extending laterally outward from a fuselage 104. Each of the wings 102 of the illustrated example supports an aircraft engine 106 via a pylon 108. A compartment 110

(e.g., a cargo compartment, a passenger compartment, a flight deck, etc.) is disposed within the fuselage 104 of the illustrated example.

Figure 2:
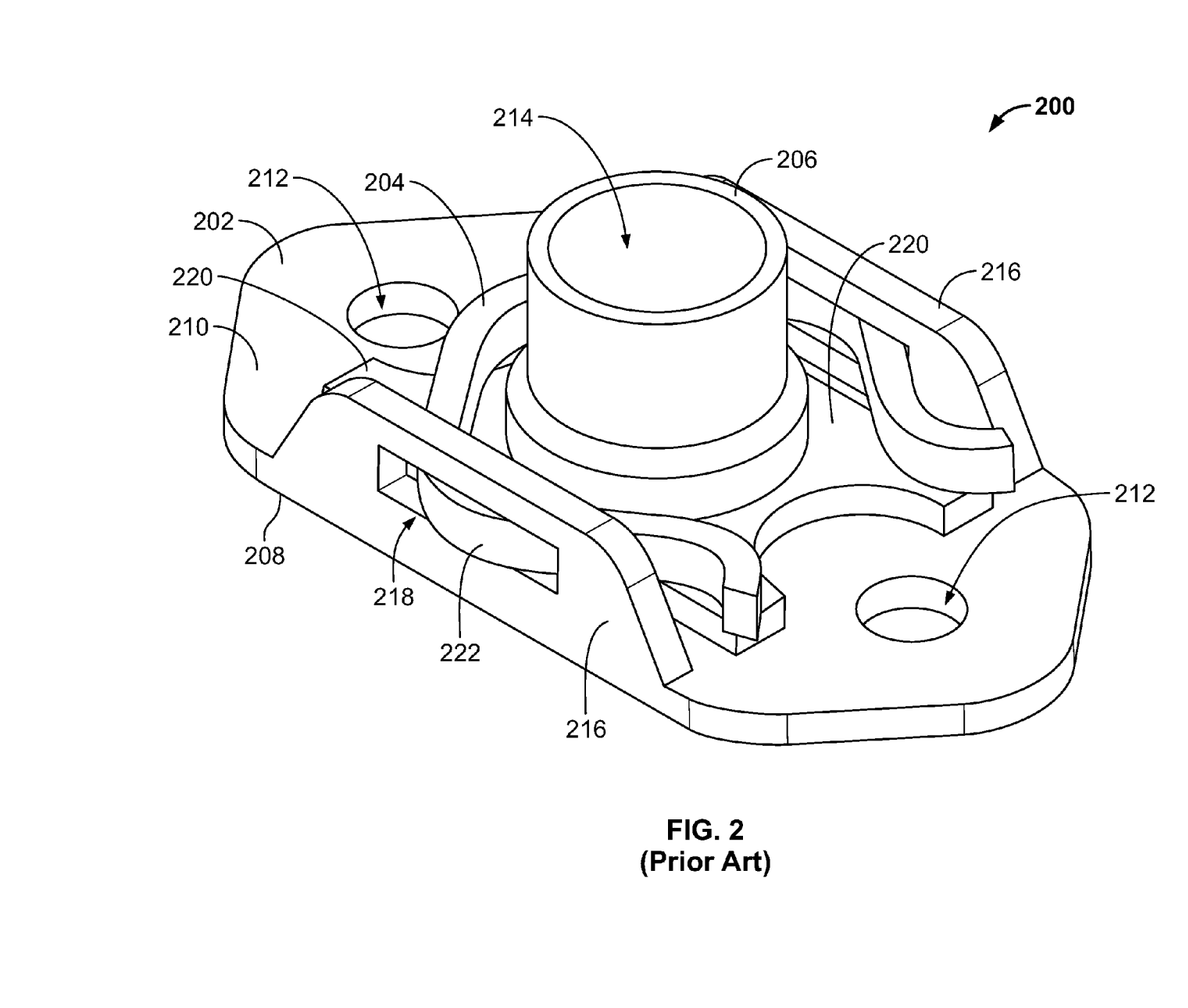
FIG. 2 is a perspective view of a known nut retainer.

Before discussing the example retainers disclosed herein, a brief description of a known nut retainer 200 used to couple objects together is provided in connection with FIG. 2. As illustrated in FIG. 2, the known nut retainer 200 includes a base 202 and a clip 204 (e.g., a c-ring) that retains a nut 206 against the base 202. The base 202 of the nut retainer 200 includes a first side 208 that is to engage a surface of one of the objects. Further, the base 202 includes a second side 210 opposite the first side 208 to which the nut 206 engages when retained by the nut retainer 200. The base 202 defines apertures 212 through which fasteners extend to couple the nut retainer 200 to one of the objects. Although not shown in FIG. 2, the known nut retainer 200 defines a center aperture that aligns with a threaded aperture 214 of the nut 206. The center aperture of the base 202 has a slightly larger width than the aperture 214 of the nut 206 so that a fastener may extend through the center aperture and be received by the nut 206. Further, as illustrated in FIG. 2, opposing side walls 216 extend from the second side 210 of the base 202. Each of side walls 216 of the known nut retainer 200 defines a slot 218. The nut 206 includes protrusions 220 that are clamped to the second side 210 of the base 202 via the clip 204 to retain the nut 206. To clamp the nut 206 against the base 202, a portion 222 of the clip 204 extends into the slot to position the clip 204 relative the base 202.

To couple the objects together using the known nut retainer 200, the objects are temporarily assembled into position relative to each other. Once the objects are assembled, the aperture through which the fastener is to extend is formed in the objects via a tool (e.g., a drill). Subsequently, the objects are disassembled to enable an assembler to couple the base 202 of the retainer 200 to the surface of one of the objects so that the center aperture of the base 202 aligns with the aperture of the objects. After the base 202 is coupled to the surface, the nut 206 is held against the base 202 so that the aperture 214 of the nut 206 coaxially aligns with the center aperture of the base 202 and the aperture of the objects. The portions 222 of the clip 204 are inserted into slots 218 of the base 202 to retain the nut 206 between the clip 204 and the base 202 of the nut retainer 200. In some examples, based on the position of the aperture of the objects, an assembler may have difficulty inserting the clip 204 into the slots 218 of the base 202 while holding the nut 206 in place. Further, after the nut 206 is coupled to the surface of one of the objects via the retainer 200, the objects are reassembled, the fastener is inserted through the aperture of the objects, and the fastener is threadably received by the nut 206 to couple the objects together. Because of the assembly, disassembly, and reassembly of the objects and/or because of the difficulty in positioning the nut 206 in the retainer 200, use of the known retainer 200 may result in increased manufacturing time and/or costs.

Figure 3:
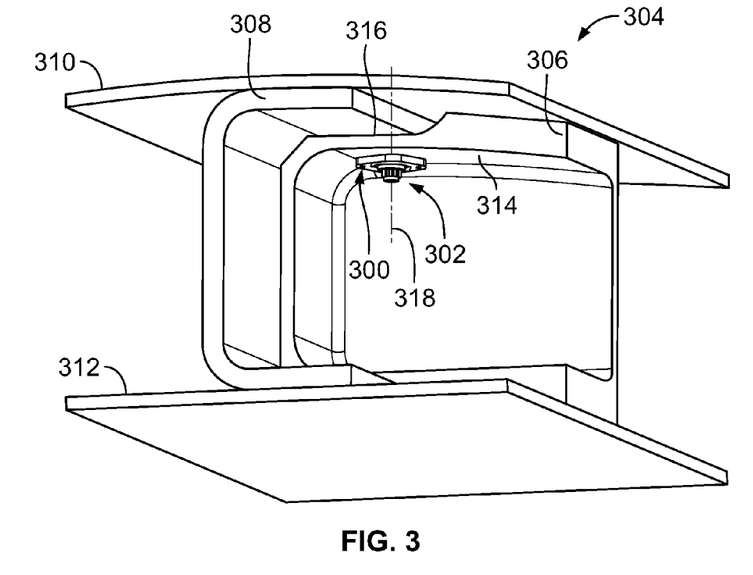
FIG. 3 illustrates an example retainer retaining a nut to couple objects together in accordance with the teachings herein.

FIG. 3 illustrates an example retainer 300 retaining a fastener receiver or nut 302 to couple objects together in accordance with the teachings herein. In the illustrated example, the retainer 300 and the nut 302 are utilized to form an assembly 304 of an aircraft wing (e.g., one of the wings 102 of the aircraft 100 of FIG. 1). For example, the retainer 300, the nut 302, and a corresponding fastener are utilized to couple a fitting 306, a spar 308, and a skin panel 310 of the assembly 304. Further, another retainer (e.g., substantially similar or identical to the retainer 300), nut (e.g., substantially similar or identical to the retainer 302), and fastener may be utilized to couple another skin panel 312 to an opposing side of the fitting 306 and the spar 308.

As illustrated in FIG. 3, the retainer 300 is coupled to a first surface 314 (e.g., an inner surface) of the fitting 306, the spar 308 is coupled to an opposing second surface 316 (e.g., an outer surface) of the fitting 306, and the skin panel 310 is coupled to the spar 308 opposite the fitting 306. The retainer 300 is coupled to the first surface 314 of the fitting 306 such that opening(s) of the retainer 300 (e.g., a first opening 440 and/or a second opening 442 of FIG. 4B) and an aperture of the nut 302 align with an aperture formed in the fitting 306, the spar 308, and the skin panel 310 of the assembly 304. For example, the nut 302 and the retainer 300 align with a longitudinal axis 318 of the aperture of the assembly 304.

As disclosed in further detail below, the example retainer 300 reduces manufacturing time and/or costs associated with forming the assembly 304 by enabling the fitting 306, the spar 308, and the skin panel 310 to remain assembled together (i.e., without disassembly and subsequent reassembly) throughout the manufacturing process. For example, the retainer 300 is initially coupled to the first surface 314 of the fitting 306 (e.g., via welding, an adhesive, fasteners 420 of FIG. 4, etc.). Subsequently, the fitting 306, the spar 308, and the skin panel 310 are assembled, and the aperture is formed in the fitting 306, the spar 308, and the skin panel 310 by a tool (e.g., a drill) without damaging the retainer 300 that remains coupled to the fitting 306. Thus, because the retainer 300 remains coupled to the fitting 306 while the aperture is formed, the assembly 304 is not disassembled to enable the retainer 300 to couple to the fitting 306. Further, after the aperture is formed, the nut 302 is inserted into the retainer 300 (e.g., without disassembling the assembly 304). The corresponding fastener is inserted through the aperture and threadably received by the nut 302 that is retained by the retainer 300 to couple the fitting 306, the spar 308, and the skin panel 310 of the assembly 302 together.

Figure 4A:
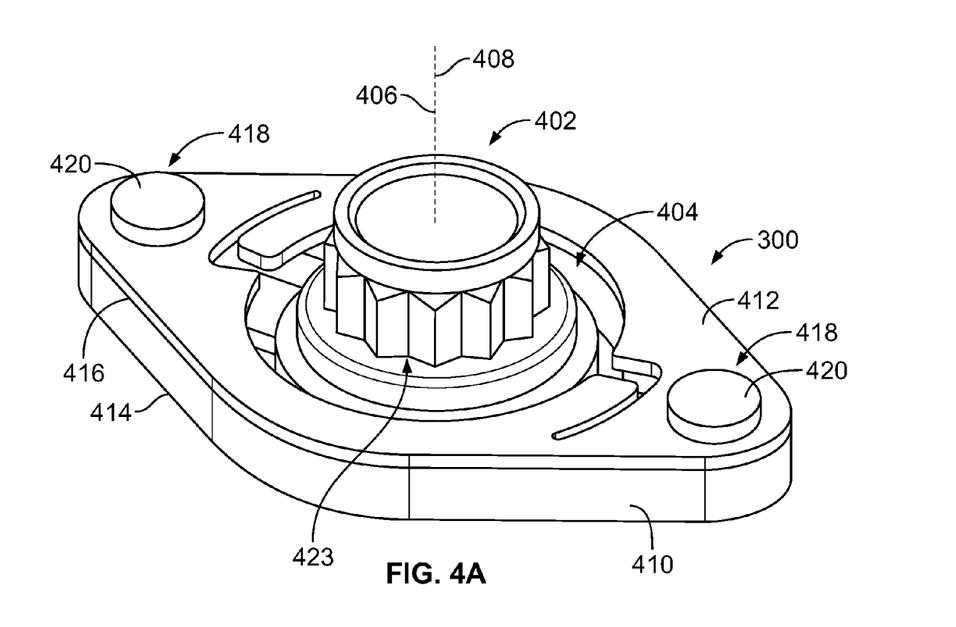
FIG. 4A is a perspective view of the retainer of FIG. 3 and a nut assembly.
Figure 4B:
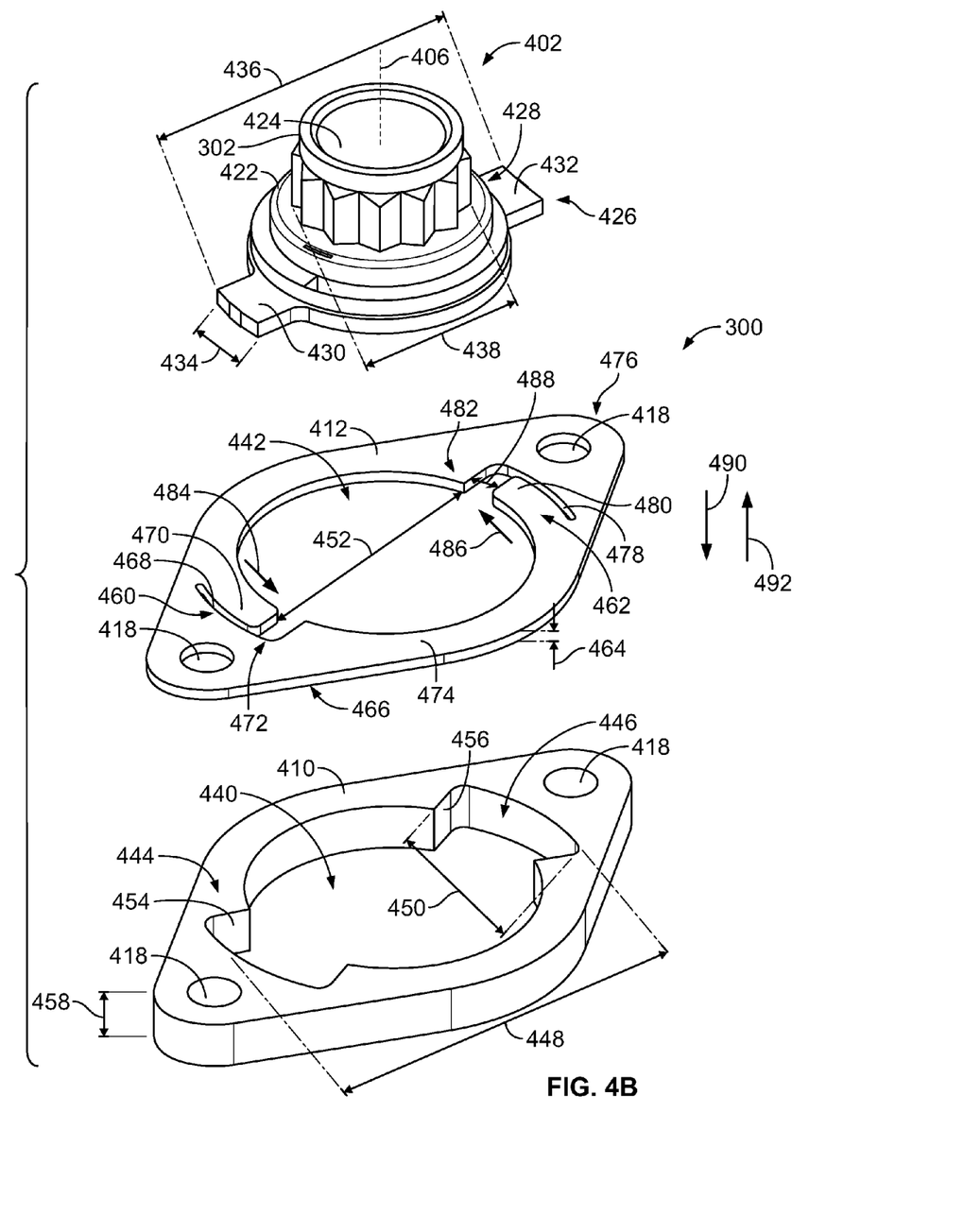
FIG. 4B is an exploded view of the retainer and the nut assembly of FIG. 3.

FIGS. 4A and 4B illustrate the example retainer 300 and an example nut assembly 402 in further detail. More specifically, FIG. 4A depicts the assembled retainer 300 retaining the nut assembly 402, and FIG. 4B depicts an exploded view of the nut assembly 402 and the retainer 300.

As illustrated in FIG. 4A, the nut assembly 402 is disposed in an aperture 404 (e.g., a first aperture) defined by the retainer 300. For example, when the nut assembly 402 is disposed in the aperture 404, a center axis 406 of the nut assembly 402 approximately aligns (e.g., is approximately coaxial) with a center axis 408 of the aperture 404 of the retainer 300. In the illustrated example, the retainer 300 is approximately rhombus-shaped. However, other shapes could be used without departing from the scope of this disclosure. The retainer 300 includes a first plate 410 (e.g., a first portion) that receives the nut assembly 402 and a second plate 412 (e.g. a second portion) that retains the nut assembly 402 in the retainer 300. In the illustrated example, the first plate 410 and the second plate 412 are detachably coupleable to each other. Each of the first plate 410 and the second plate 412 is formed, for example, via a stamping process, an additive manufacturing process (e.g., 3D printing, etc.). In other examples, the first plate 410 and the second plate 412 may be integrally formed.

In the illustrated example, the first plate 410 includes a first surface 414 that is to couple to the first surface 314 of the fitting 306 (FIG. 3) and an opposing second surface 416 that couples to the second plate 412. The first plate 410 and the second plate 412 define apertures 418 (e.g., second apertures) through which the fasteners 420 extend to couple the second plate 412 to the first plate 410. Further, the fasteners 420 extend through the apertures 418 to couple the first plate 410 and the second plate 412 of the retainer 300 to the first surface 314 of the fitting 306. In some examples, the fasteners 420 that couple the retainer 300 to the fitting are rivets. In other examples, the fasteners 420 are threaded (e.g., threaded bolts) and are received by threaded blind holes of the fitting 306 to couple the retainer 300 to the fitting 306. The apertures 418 enable the first plate 410 and the second plate 412 to be detachably couplable to the fitting 306 to enable the first plate 410, the second plate 412 and/or or the nut assembly 402 retained by the retainer 300 to be repaired or replaced without having to disassemble the fitting 306, the spar 308, and the skin panel 310. In the illustrated example, the apertures 418 extend along a plane through which the center axis 408 of the aperture 404 extends such that the aperture 404 of the retainer 300 is positioned between the other apertures 418 of the retainer 300. Additionally or alternatively, welding and/or adhesive(s) may be utilized to couple the second plate 412 to the first plate 410 and/or the retainer 300 to the fitting 306.

Turning to FIG. 4B, the nut assembly 402 includes the nut 302 and a ring 422 through which the nut 302 extends. The nut 302 and the ring 422 include reciprocating ridges or teeth 423 to prevent the nut 302 and the ring 422 from rotating relative to each other when the nut 302 is extended through the ring 422. For example, the teeth 423 of the nut 302 engage the reciprocating teeth 423 of the ring 422 so that the ring 422 rotates as the nut 302 rotates and/or the nut 302 rotates as the ring 422 rotates. The nut 302 includes an inner surface 424 that is to couple to the fastener that extends through the aperture of the fitting 306, the spar 308, and the skin panel 310 (FIG. 3). For example, the inner surface 424 of the nut 302 may be threaded to threadably receive the fastener. The nut 302 is composed of, for example, steel and/or any other material that enables the nut 302 to couple to the fastener without damaging the nut 302 and/or the fastener. In some examples, the nut 302 is composed of the same material (e.g., steel) as the fastener to prevent the nut 302 and/or the fastener from being damaged when the nut 302 threadably receives the fastener.

Further, the nut assembly 402 includes a first portion 426 and a second portion 428 spaced apart from the first portion along the center axis 406 of the nut assembly 402. The first portion 426 includes a first protrusion 430 and a second protrusion 432 of the ring 422 that extend and/or protrude away from the center axis 406 and each have a width 434 (e.g., a first width). In the illustrated example, the first protrusion 430 is opposite the second protrusion 432 (e.g., spaced apart by about 180 degrees). In other examples, the first and second protrusions 430, 432 may be positioned differently relative to each other (e.g., spaced apart by about 135 degrees, 90 degrees, 45 degrees, etc.). Additionally or alternatively, the first portion 426 of the nut assembly 402 may include more (e.g., 3, 4, 5, etc.) or less (e.g., 1) protrusions. In the illustrated example, the first portion 426 of the nut assembly 402 has a width 436 (e.g., a second width) that is defined, in part, by the first protrusion 430 and the second protrusion 432 of the ring 422. Further, the second portion 428 of the nut assembly 402 has a width 438 (e.g., a third width) that is less than the width 436 of the first portion 426 of the nut assembly 402.

As illustrated in FIG. 4B, the example retainer 300 includes the first plate 410 and the second plate 412. In the illustrated example, each of the first and second plates 410, 412 is rhombus-shaped. Further, each of the first and second plates 410, 412 defines the apertures 418 through which the fasteners 420 extend to couple the second plate 412 to the first plate 410 and/or to couple the first and second plates 410, 412 to the surface 314 of the fitting 306. In the illustrated example, the first plate 410 defines the first opening 440 (e.g., a substantially circular opening) and the second plate 412 defines the second opening 442 (e.g., a substantially circular opening). The second opening 442 and the first opening 440 align along the center axis 408 of the retainer 300 when the second portion 412 is coupled to the first portion 410 to form the aperture 404 of the retainer 300.

The first plate 410 defines a first cavity 444 and a second cavity 446 of the first opening 440. As illustrated in FIG. 4B, the first opening 440 has a width 448 (e.g., a fourth width) that is defined, in part, by the first and second cavities 444, 446. Further, each of the first and second cavities 444, 446 has a width 450 (e.g., a fifth width). The width 448 of the first opening 440 is greater than the width 436 of the first portion 426 of the nut assembly 402 and the width 450 of the first and second cavities 444, 446 is greater than the width 434 of the first and second protrusions 430, 432 to enable the first protrusion 430 of the ring 422 to be received by the first cavity 444 and the second protrusion 432 of the ring 422 to be received by the second cavity 446 when the nut assembly 402 is retained by the retainer 300.

To retain the nut assembly 402 in the retainer 300, the second plate 412 is coupled to the second surface 416 of the first plate 410 when the first surface 414 is coupled to the fitting 306 to enclose the first portion 426 of the nut assembly 402 in the first opening 440 between the second plate 412 and the fitting 306. For example, the second opening 442 of the second plate 412 has a width 452 (e.g., a sixth width) that is less than the width 436 of the first portion 426 of the nut assembly 402 to deter the first portion 426 from traversing through the second opening 442. Further, the width 438 of the second portion 428 of the nut assembly 402 is less than the width 452 of the second opening 442 to enable the second portion 428 of the nut assembly 402 to extend through the second opening 442. For example, the width 452 of the second opening 442 may provide a clearance of about 0.04 inches between the second plate 412 and the second portion 428 of the nut assembly 402 when the nut assembly 402 is retained by the retainer 300.

When the nut assembly 402 is retained by the retainer 300, a wall 454 (e.g., a first wall) of the first plate 410 that defines the first cavity 444 is to engage the first protrusion 430. Further, a wall 456 (e.g., a second wall) that defines the second cavity 446 is to engage the second protrusion 432. The walls 454, 456 engage the respective protrusions 430, 432 of the ring 422 to limit rotation of the nut 302 and, thus, enable the nut 302 to threadably receive the fastener to couple the fitting 306, the spar 308, and the skin panel 310 together. For example, the first plate 410 of the retainer 300 is composed of a substantially hard material, such as steel or another substantially hard metal, and has a thickness 458 to enable the first plate 410 to withstand a torque and/or force applied to the walls 454, 456 by the respective first and second protrusions 430, 432 of the nut assembly 402 as the fastener is tightened in the nut 302.

Further, in the illustrated example, the width 448 of the first opening 440 and the width 452 of the second opening 442 are substantially greater than a width of the aperture of the assembly 304 (e.g., the first and second openings 440, 442 are oversized relative the aperture of the assembly 304 of FIG. 3). Thus, a tool (e.g., a drill) may form the aperture in the fitting 306, the spar 308, and the skin panel 310 without contacting and/or otherwise damaging the retainer 300 that remains coupled to the fitting 306 as the aperture is being formed.

Because the retainer 300 is coupled to the fitting 306 before the nut assembly 402 is received by the retainer 300, the second plate 412 includes flexible portions 460, 462 adjacent the second opening 442 that flex and/or deflect to enable the first portion 426 of the nut assembly 402 to be inserted into and/or received by the first opening 440 of the first plate 410. The second plate 412 is composed of, for example, steel, a thermoplastic, or another substantially hard material and has a thickness 464 (e.g., less than the thickness 458) that enables the flexible portions 460, 462 to deflect when a force is applied. In the illustrated example, the flexible portion 460 is located on a first side 466 of the second plate 412 and includes a groove 468 (e.g., a first groove) and a deflectable tab 470 (e.g., a first deflectable tab). The groove 468 is curved and defines a gap 472 (e.g., a first gap) between the deflectable tab 470 and a body 474 of the second plate 412. Further, the flexible portion 462 is located on a second side 476 opposite the first side 466 and includes a groove 478 (e.g., a second groove) and a deflectable tab 480 (e.g., a second deflectable tab). The groove 478 is curved and defines a gap 482 (e.g., a second gap) between the deflectable tab 480 and the body 474 of the second plate 412. In the illustrated example, the deflectable tab 470 extends in a first direction 484 and the opposing deflectable tab 480 extends in a second direction 486 opposite the first direction 484. Further, each of the gaps 472, 482 has a width 488 (e.g., a seventh width).

To enable the first portion 426 of the nut assembly 402 to be inserted into and/or be received by the first opening 440 of the retainer 300, the flexible portion 460 aligns with and/or covers the first cavity 444 and the flexible portion 462 aligns with and/or covers the second cavity 446. For example, the deflectable tab 470 deflects in a first direction 490 to increase the gap 472 and, thus, enable the first protrusion 430 of the nut assembly 402 to clear the body 474 of the second plate 412. Further, the deflectable tab 480 deflects in the first direction 490 to increase the gap 482 and, thus, enable the second protrusion to clear the body 474 of the second plate 412. As illustrated in FIG. 4B, the first cavity 444 extends beyond the flexible portion 460 in the direction 484 (e.g., as a result of the width 450 and/or positioning of the first cavity 444 relative the flexible portion 460) and the first cavity 446 extends beyond the flexible portion 462 in the direction 486 (e.g., as a result of the width 450 and/or positioning of the second cavity 446 relative the flexible portion 462). Thus, the first and second cavities 444, 446 enable the nut assembly 402 to be rotated (e.g., in a counterclockwise direction in the illustrated example) upon the first and second protrusions 430, 432 clearing the body 474 of the second plate 412 to enable the first and second protrusions 430, 432 to disengage from the respective the deflectable tabs 470, 480 and be received by the respective first and second cavities 444, 446 of the first opening 440. In other words, the first and second protrusions 430, 432 are inserted into and/or received by the respective first and second cavities 444, 446 by deflecting the deflectable tabs 470, 480 in the first direction 490 and subsequently rotating and/or twisting the first and second protrusions 430, 432 through the gaps 472, 482 of the respective flexible portions 460, 462.

Further, the flexible portions 460, 462 of the second plate 412 enable the first portion 426 of the nut assembly 402 to be removed from the first opening 440 of the retainer (e.g., for repair, replacement and/or repositioning). For example, to remove the nut assembly 402 from the retainer 300, the first and second protrusions 430, 432 engage and apply a force to the respective deflectable tabs 470, 480 to cause the deflectable tabs 470, 480 to flex and/or deflect in a second direction 492 opposite the first direction 490. The deflection of the deflectable tabs 470, 480 increases the respective gaps 472, 482 and, thus, enables the first and second protrusions 430, 432 of the nut assembly 402 to clear the body 474 of the second plate 412. Upon the first and second protrusions 430, 432 clearing the body 474 of the second plate 412, the nut assembly 402 is rotated and/or twisted (e.g., in a counterclockwise direction in the illustrated example) to enable the first and second protrusions 430, 432 to disengage from the respective the deflectable tabs 470, 480 and, thus, be removed from the retainer 300.

While the example first plate 410 defines two cavities (e.g., the first and second cavities 444, 446) and the example second plate 412 includes two flexible portions (e.g., the flexible portions 460, 462), the first opening 440 of the first plate 410 may include more (e.g., 3, 4, 5, etc.) or less (e.g., 1) cavities and/or the second plate 412 may include more (e.g., 3, 4, 5, etc.) or less (e.g., 1) flexible portions. For example, the first plate 410 may define three cavities and the second plate 412 may include three respective flexible portions that are each to receive a respective protrusion of the nut assembly 402.

Figure 5:
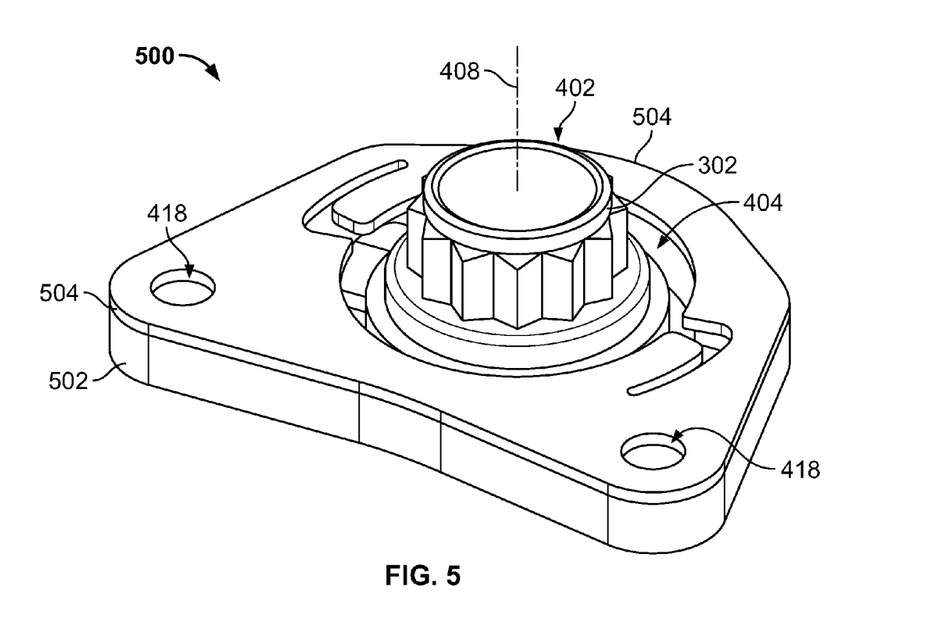
FIG. 5 illustrates another example retainer for the nut assembly of FIGS. 4A-4B in accordance with the teachings herein.

FIG. 5 illustrates another example retainer 500 that retains the nut 302 and/or the nut assembly 402 in accordance with the teachings herein. The retainer 500 includes a first plate 502 (e.g., a first portion) and a second plate 504 (e.g., a second portion) that is detachably coupled to the first plate 502. In the illustrated example, the retainer 500, the first plate 502, and the second plate 504 are substantially polygonally-shaped. Further, the apertures 418 of the first and second plates 502, 504 that receive the fasteners 420 (FIG. 4A) to couple the retainer 500 to the fitting 306 (FIG. 3) extend along a plane parallel to and spaced apart from the center axis 408 of the aperture 404 that receives the nut assembly 402 and/or the nut 302. For example, the aperture 404 is closer to an edge 504 of the retainer 500 than the apertures 418 are to the edge 504 to enable the aperture 404, the nut assembly 402 and/or the nut 302 to be positioned closer to an edge and/or corner of the fitting 306 when the retainer 500 is coupled to the fitting 306 via the fasteners 420 that extend through the apertures 418. In other examples, the apertures 418 may be non-parallel relative to the center axis 408 of the aperture 404. Further, other characteristics of the example retainer 500 of FIG. 5 are substantially similar or identical to the characteristics of the example retainer 300 of FIGS. 3-4B. Because the retainer 300 is described in detail in connection with FIGS. 3-4B, those characteristics of the retainer 500 of FIG. 5 are not described in further detail below.

Figure 6:
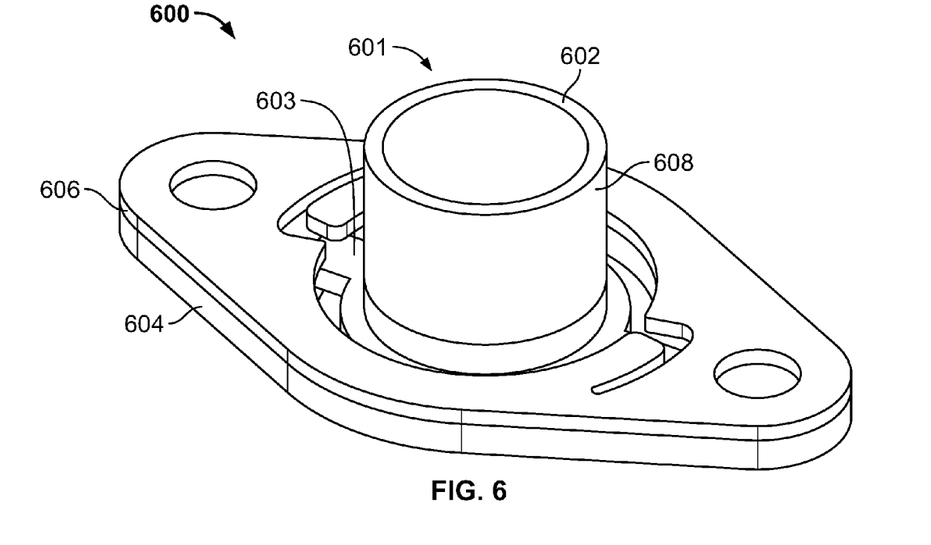
FIG. 6 illustrates another example retainer for a nut assembly in accordance with the teachings herein.

FIG. 6 illustrates another example retainer 600 that retains another nut assembly 601 in accordance with the teachings herein. In the illustrated example, the nut assembly 601 includes another example fastener receiver or nut 602 from which protrusions 603 extend. The retainer 600 includes a first plate 604 (e.g., a first portion) and a second plate 606 (e.g., a second portion) that is detachably coupled to the first plate 604. In the illustrated example, the retainer 600, the first plate 604, and the second plate 606 are substantially rhombus-shaped. Further, the nut 602 has an outer surface 608 that is substantially smooth (e.g., without ridges). Other characteristics of the example retainer 600 and the example nut assembly 601 of FIG. 6 are substantially similar or identical to the characteristics of the example retainer 300 and the example nut assembly 402 of FIGS. 4A-4B, respectively. Because the retainer 300 and the nut assembly 402 are described in detail in connection with FIGS. 4A-4B, those characteristics of the retainer 600 and the nut assembly 601 of FIG. 6 are not described in further detail below.

Figure 7A:
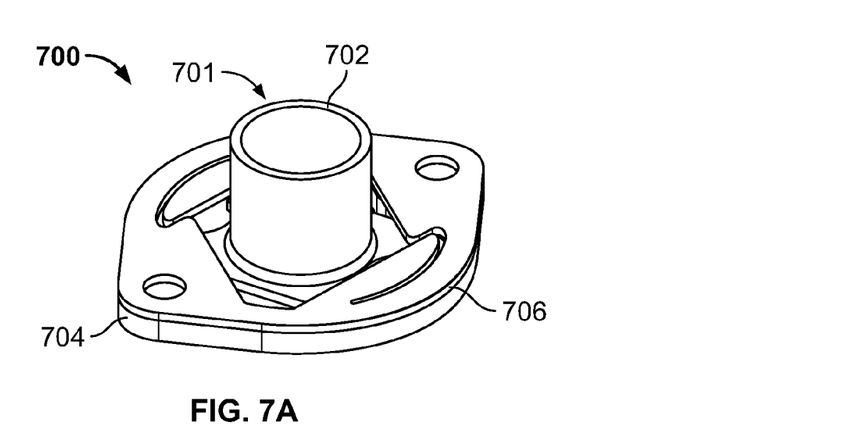
FIG. 7A is a perspective view of another example retainer and a nut assembly in accordance with the teachings herein.
Figure 7B:
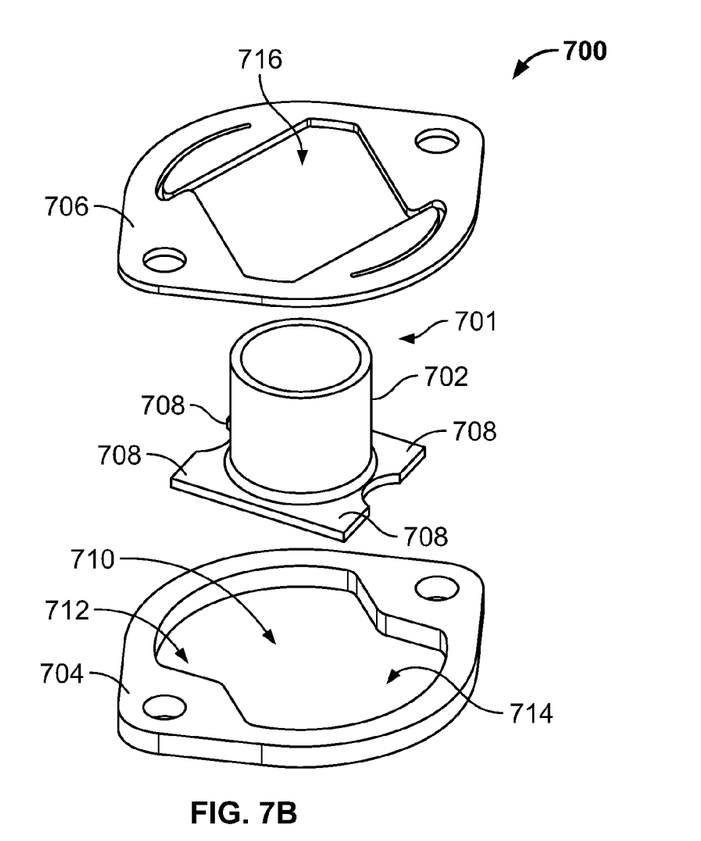
FIG. 7B is an exploded view of the retainer and the nut assembly of FIG. 7A.

FIGS. 7A and 7B illustrate another example retainer 700 that retains another nut assembly 701 having a fastener receiver or nut 702 in accordance with the teachings herein. More specifically, FIG. 7A depicts the assembled retainer 700 retaining the nut 702, and FIG. 7B depicts an exploded view of the retainer 700 and the nut 702. The retainer 700 includes a first plate 704 (e.g., a first portion) and a second plate 706 (e.g., a second portion) that is detachably couplable to the first plate 704. In the illustrated example, the retainer 700, the first plate 704, and the second plate 706 are substantially spheroid-shaped. As illustrated in FIG. 7B, the nut 702 includes four flanges or protrusions 708. A first opening 710 defined by the first plate 704 includes a first portion or half 712 that receives two of the protrusions 708 and an adjacent second portion or half 714 that receives the other two of the protrusions 708. To retain the protrusions 708 of the nut 702 in the corresponding first and second portions 712, 714 of the first plate 704, the second plate 706 defines a second opening 716 that is substantially rhombus-shaped. Further, other characteristics of the example retainer 700 and the example nut assembly 701 of FIGS. 7A-7B are substantially similar or identical to the characteristics of the example retainer 300 and the example nut assembly 402 of FIGS. 3-4B, respectively. Because the retainer 300 and the nut assembly 402 are described in detail in connection with FIGS. 3-4B, those characteristics of the retainer 700 and the nut assembly 701 of FIGS. 7A-7B are not described in further detail below.

Figure 8:
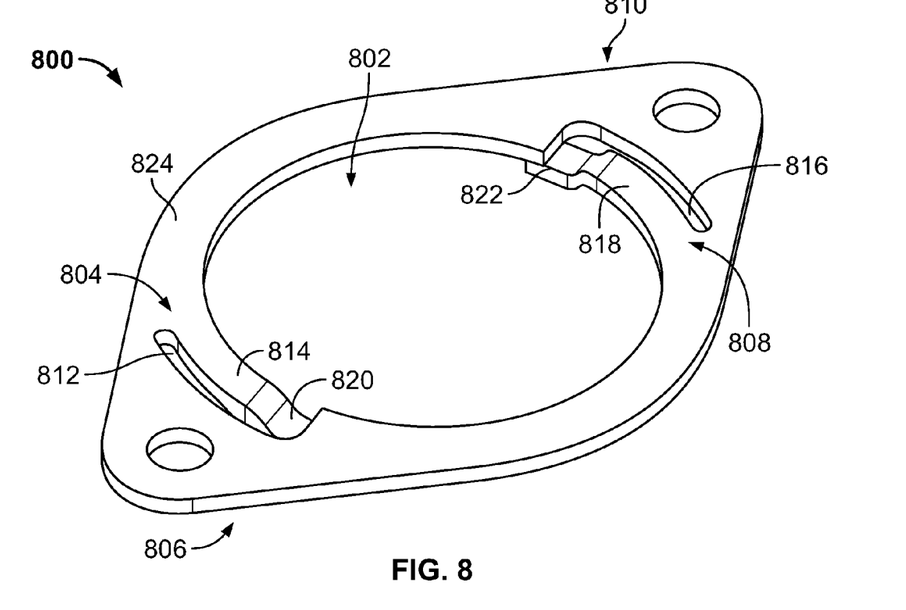
FIG. 8 illustrates an example plate of a nut retainer in accordance with the teachings herein.

FIG. 8 illustrates another example plate 800 (e.g., a second plate to be coupled to a first plate) of a nut retainer (e.g., the nut retainer 300 of FIGS. 3-4B) in accordance with the teachings herein. The plate 800 is formed, for example, an additive manufacturing process (e.g., 3D printing, etc.). As illustrated in FIG. 8, the plate 800 defines an opening 802 through which a nut assembly (e.g., the nut assembly 402 of FIGS. 4A-4B) traverses to be retained by the nut retainer. A flexible portion 804 (e.g., a first flexible portion) is adjacent the opening 802 on a first side 806 of the plate 800, and a flexible portion 808 (e.g., a second flexible portion) is adjacent the opening 802 on an opposing second side 810 of the plate 800. The flexible portion 804 includes a groove 812 (e.g., a first groove) that defines a deflectable tab 814 (e.g., a first deflectable tab), and the flexible portion 808 includes a groove 816 (e.g., a second groove) that defines a deflectable tab 816 (e.g., a second deflectable tab).

As illustrated in FIG. 8, the deflectable tabs 814, 818 include respective distal ends 820, 822 (e.g., a first distal end, a second distal end). In the illustrated example, the deflectable tabs 814, 818 have curved or angled cross-sections to enable respective portions of the deflectable tabs 814, 818 to be overlapped by a body 824 of the plate 800 to further enable the nut retainer to retain the nut assembly. For example, the body 804 of the plate 800 overlaps the distal ends 820, 822 to enable the deflectable tabs 814, 818 to deflect in a first direction to enable the nut assembly to be received by the nut retainer and to deter the deflectable tabs 814, 818 from deflecting in an opposing second direction to retain the nut assembly to be retained by the nut retainer.

Figure 9:
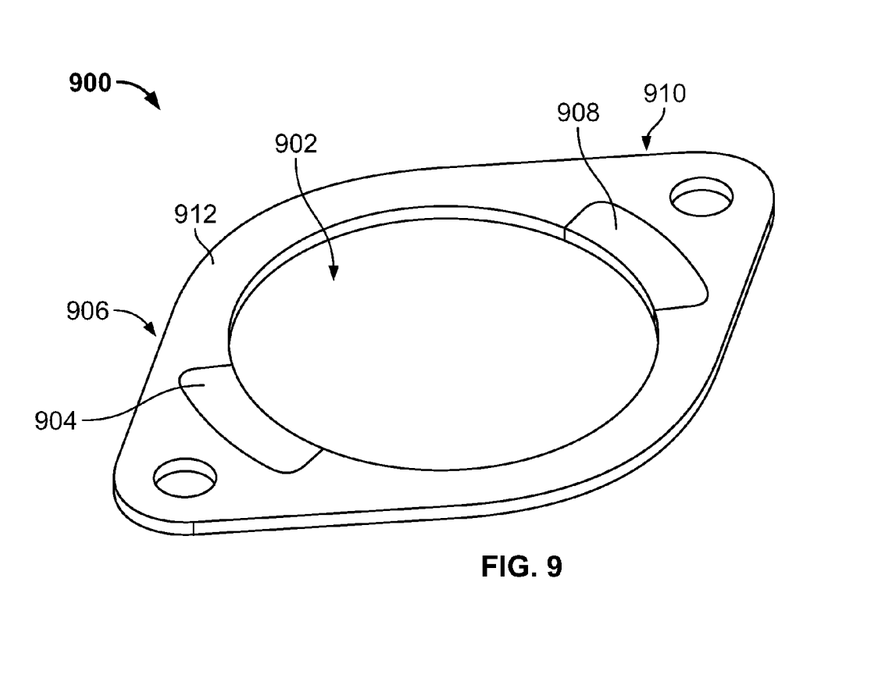
FIG. 9 illustrates another example plate of a nut retainer in accordance with the teachings herein.

FIG. 9 illustrates another example plate 900 (e.g., a second plate to be coupled to a first plate) of a nut retainer (e.g., the nut retainer 300 of FIGS. 3-4B) accordance with the teachings herein. As illustrated in FIG. 9, the plate 800 defines an opening 902 through which a nut assembly (e.g., the nut assembly 402 of FIGS. 4A-4B) traverses to be retained by the nut retainer. A flexible portion 904 (e.g., a first flexible portion) is adjacent the opening 902 on a first side 906 of the plate 900, and a flexible portion 908 (e.g., a second flexible portion) is adjacent the opening 902 on an opposing second side 910 of the plate 900. For example, a body 912 of the plate 900 is composed of steel or another substantially hard material to retain the nut assembly in the nut retainer, and the flexible portions 904, 908 are composed of rubber, a flexible plastic, or another flexible material that flexes and/or defects to enable the nut assembly to enter into and/or be removed from the nut retainer. The flexible portions 904, 908 are integrally formed with the body 912 of the plate 900 via, for example, an additive manufacturing process (e.g., 3D printing).

Further, other characteristics of the example plate 800 of FIG. 8 and the example plate 900 of FIG. 9 are substantially similar or identical to the characteristics of the example second plate 412 of FIGS. 4A-4B. Because the second plate 412 is described in detail in connection with FIGS. 4A-4B, those characteristics of the plate 800 of FIG. 8 and the plate 900 of FIG. 9 are not described in further detail below.

Figure 10:
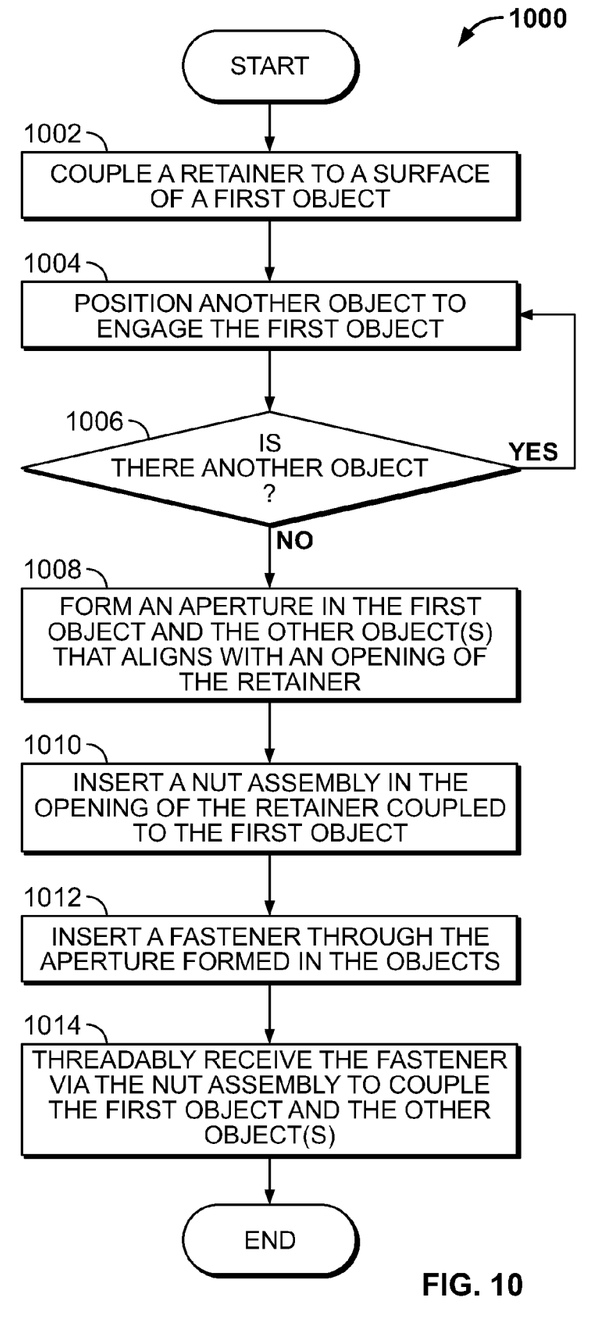
FIG. 10 is a flowchart representative of an example method to couple objects together via the example retainer of FIGS. 3-4B, the example retainer of FIG. 5, the example retainer of FIG. 6, the example retainer of FIGS. 7A-7B in accordance with the teachings herein.

FIG. 10 is a flowchart representative of an example method 1000 to couple objects together via a retainer in accordance with the teachings herein. Although the example method 1000 is described with reference to the flowchart illustrated in FIG. 10, many other methods for coupling objects together via the retainer may alternatively be used. For example, the order of execution of the blocks may be changed, and/or some of the blocks described changed, eliminated, and/or combined.

The example method 1000 for coupling objects together via a retainer is discussed in connection with the example assembly 304 of FIG. 3, the example retainer 300 of FIGS. 3-4B, the example nut assembly 402 of FIGS. 4A-5, the example retainer 500 of FIG. 5, the example retainer 600 of FIG. 6, the example nut assembly 601 of FIG. 6, the example retainer 700 of FIGS. 7A-7B, the example nut assembly 701 of FIGS. 7A-7B, the example plate 800 of FIG. 8 and/or the example plate 900 of FIG. 9. Further, because the example method 1000 may refer to the example assembly 304 of FIG. 3, the example retainer 300 of FIGS. 3-4B, the example nut assembly 402 of FIGS. 4A-5, the example retainer 500 of FIG. 5, the example retainer 600 of FIG. 6, the example nut assembly 601 of FIG. 6, the example retainer 700 of FIGS. 7A-7B, the example nut assembly 701 of FIGS. 7A-7B, the example plate 800 of FIG. 8 and/or the example plate 900 of FIG. 9, components identified in 3-9 having functions substantially similar or identical to the functions of components described below will not be described in detail again. Instead, the same reference numbers will be used for like structures.

The example method 1000 disclosed herein starts at block 1000 by coupling a retainer (e.g., the retainer 300 of FIGS. 3-4B, the retainer 500 of FIG. 5, the retainer 600 of FIG. 6, the retainer 700 of FIGS. 7A-7B) to a surface (e.g., the first surface 316 of FIG. 3) of a first object (e.g., the fitting 306 of FIG. 3). For example, the retainer is coupled to the first object via fasteners (e.g., the fasteners 420 of FIG. 4A) that are inserted through apertures (e.g., the apertures 418 of FIGS. 4A-7B) defined by a first plate (e.g., the first plate 410 of FIGS. 4A-4B, the first plate 502 of FIG. 5, the first plate 604 of FIG. 6, the first plate 704 of FIGS. 7A-7B) and a second plate (e.g., the second plate 412 of FIGS. 4A-4B, the second plate 504 of FIG. 5, the second plate 606 of FIG. 6, the second plate 706 of FIGS. 7A-7B, the plate 800 of FIG.

8, the plate 900 of FIG. 9) and received by the first object (e.g., via an aperture of the first object).

At block 1004, another object (e.g., the spar 308 of FIG. 3) is positioned to engage the first object. For example, the other object is positioned to engage a surface (e.g., the second surface 316 of FIG. 3) of the first object opposite the surface to which the retainer is coupled. At block 806, the example method 1000 includes identifying whether there is another object to include in an assembly of objects (e.g., the assembly 304 of FIG. 3). If there is another object (e.g., the skin panel 310 of FIG. 3) to be included, block 1004 is repeated. Blocks 1004, 1006 are repeated until no other objects are identified.

At block 1008, an aperture (e.g., the aperture of the assembly 304 of FIG. 3) that aligns with an opening (e.g., the first opening 440 and/or the second opening 442 of FIG. 4B, the first opening 710 and/or the second opening 716 of FIG. 7B) of the retainer is formed (e.g., drilled) in the first object and the other object(s). That is, the aperture is formed in the first object and the other object(s) while the retainer remains coupled to the first object. In some examples, the aperture is drilled through the first object and the other object(s) along an axis (e.g., the center axis 408 of FIGS. 4A and 5) of the retainer.

Upon the aperture being drilled, a nut assembly and/or a nut or fastener receiver (e.g., the nut 302 and/or the nut assembly 402 of FIGS. 3-5, the nut assembly 601 and/or the nut 602 of FIG. 6, the nut assembly 701 and/or the nut 702 of FIGS. 7A-7B) is inserted in the opening of the retainer that is coupled to the first object (block 1010). For example, the nut assembly is inserted in the opening of the receiver by pushing the nut assembly past deflectable tab(s) (the deflectable tab 470 and/or the deflectable tab 480 of FIG. 4B) of the receiver that subsequently retain the nut assembly in the retainer. Because the retainer remains coupled to the first object when the aperture is drilled at block 1008, the nut assembly may be inserted into the receiver without disassembling the first object and the other object(s) from each other.

At block 1012, a fastener is inserted through the aperture formed in the first object and the other objects. Further, at block 1014, the fastener is threadably received by the nut assembly retained by the retainer to couple the first object and the other object(s) together. For example, the nut assembly engages a wall (e.g., the wall 454 and/or the wall 456 of FIG. 4B) of the first plate of the retainer to prevent the fastener receiver from rotating and, thus, to enable the nut assembly to threadably receive the fastener.

Figure 11A:
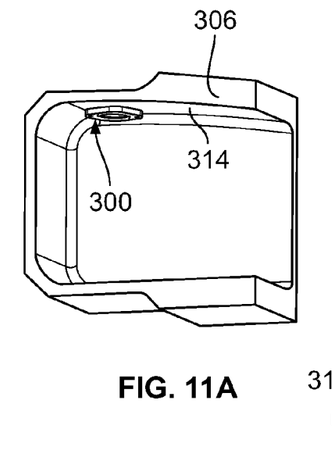
FIGS. 11A-11C illustrates an example progression of FIG. 10 of coupling the objects together via the example retainer of FIGS. 3-4B, the example retainer of FIG. 5, the example retainer of FIG. 6 and/or the example retainer of FIGS. 7A-7B.
Figure 11B:
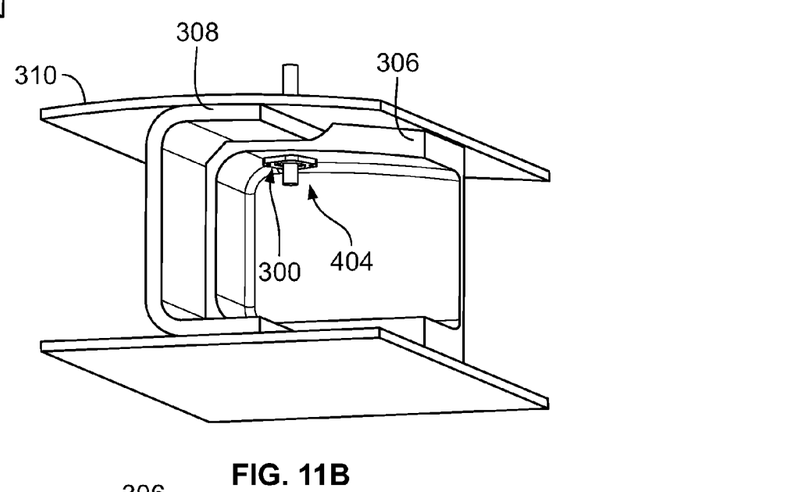
Figure 11C:
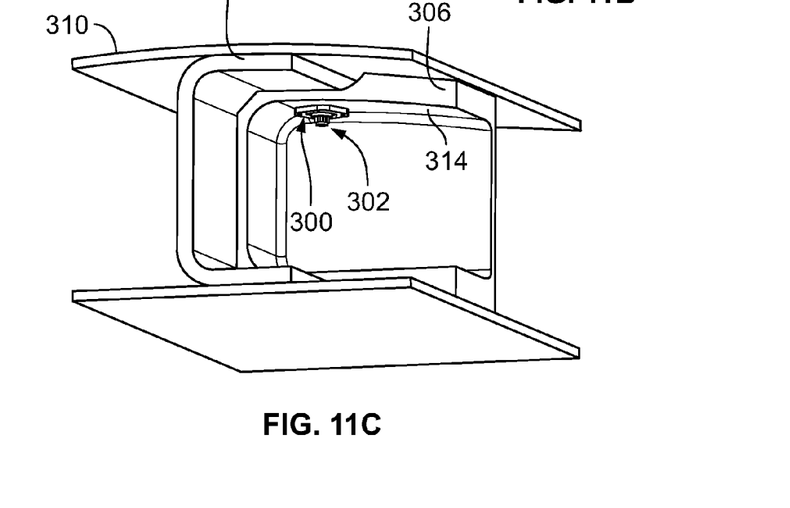

FIGS. 11A-11C illustrates steps of the method 1000 of FIG. 10 that are executed to couple the fitting 306, the spar 308, and the skin panel 310 together via the retainer 300 (or, alternatively, the retainer 500 of FIG. 5, the retainer 600 of FIG. 6, or the retainer 700 of FIGS. 7A-7B), the nut 302 (or, alternatively, the nut 602 of FIG. 6 or the nut 702 of FIGS. 7A-7B), and the fastener. For example, FIG. 11A depicts the retainer 300 coupled to the surface 314 of the fitting 306 after block 1002 of the example method 1000 of FIG. 10 is completed. FIG. 11B depicts block 1008 at which the aperture is drilled through the fitting 306, the spar 308, and the skin panel 310 to align with the aperture 404 of the retainer 300. Further, FIG. 11C depicts the nut 302 retained by the retainer 300 along the surface 314 of the fitting 306 after block 1010 is completed.

Although certain example apparatus have been described herein, the scope of coverage of this patent is not limited thereto. On the contrary, this patent covers all methods, apparatus and articles of manufacture fairly falling within the scope of the amended claims either literally or under doctrine of equivalents.

What is claimed is:

1. An apparatus comprising:
a retainer to retain a nut assembly adjacent an object, the retainer including:
a first plate defining a first opening, the first plate to couple to the object, the first opening to receive a portion of the nut assembly when the retainer is coupled to the object; and
a second plate defining a second opening and including a first deflectable tab adjacent the second opening, the second plate to couple to the first plate opposite the object, the deflectable tab of the second plate to cover a portion of the first opening of the first plate, the first deflectable tab to deflect to receive and retain the portion of the nut assembly in the first opening when the retainer is coupled to the object.

2. The apparatus of claim 1, wherein the deflectable tab is defined by a groove that extends from the second opening of the second plate, the groove defines a gap between the deflectable tab and a body of the second plate that increases as deflectable tab deflects to enable the nut assembly to enter the first opening of the first plate.

3. The apparatus of claim 1, wherein the second plate includes a second deflectable tab adjacent the second opening, the first deflectable tab located on a first side of the second opening, the second deflectable tab located on a second side of the second opening opposite the first side.

4. The apparatus of claim 3, wherein the first deflectable tab extends in a first direction and the second deflectable tab extends in a second direction opposite the first direction.

5. The apparatus of claim 3, wherein the first plate defines a first cavity and a second cavity of the first opening, the first deflectable tab aligns with the first cavity and the second deflectable tab aligns with the second cavity when the first plate is coupled to the second plate, the first and second cavities to receive protrusions of the nut assembly to limit rotation of the nut assembly when the retainer retains the nut assembly.

6. The apparatus of claim 5, wherein the first deflectable tab and the second deflectable tab extend in opposing directions to enable a first of the protrusions to rotate past the first deflectable tab into the first cavity and a second of the protrusions to rotate past the second deflectable tab into the second cavity.

7. The apparatus of claim 1, wherein the first deflectable tab is to deflect to enable the nut assembly to be removed from the retainer.

8. The apparatus of claim 1, wherein the first plate and the second plate define apertures spaced apart from the first opening and the second opening, the apertures to receive fasteners to couple the first plate and the second plate of the retainer to the object.

9. The apparatus of claim 8, wherein the first plate and the second plate are detachably couplable to the object via the fasteners to enable at least one of the first plate, the second plate, or the nut assembly retained in the retainer to be repaired or replaced.

10. The apparatus of claim 8, wherein the apertures extend along a plane that is parallel to and spaced apart from a center axis of the first and second openings.

11. An apparatus comprising:
a fastener receiver including a first protrusion; and
a retainer to retain the fastener receiver adjacent an object, the retainer including:

a first portion defining a first opening, the first portion to couple to the object, the first opening to contain a portion of the fastener receiver when the retainer is coupled to the object; and a second portion coupled to the first portion, the second portion defining a second opening and including a first flexible portion that is adjacent the second opening, the first flexible portion is to deflect in a first direction to receive the first protrusion of the fastener receiver in the first opening and is to deflect in a second direction opposite the first direction to enable removal of the fastener receiver from the first opening.

12. The apparatus of claim 11, wherein the first flexible portion includes a deflectable tab and a gap defined between the deflectable tab and a body of the second portion, the gap having a first width less than a second width of the first protrusion to enable the deflectable tab to retain the first protrusion in the first opening to enable the retainer to retain the fastener receiver.

13. The apparatus of claim 11, wherein the first portion is a first plate and the second portion is a second plate, the first plate and the second plate define apertures through which fasteners extend to couple the first plate and the second plate.

14. The apparatus of claim 11, wherein the fastener receiver includes a first portion having the first protrusion and a second portion spaced apart from the first portion along an axis of the fastener receiver, the first portion is disposed in the first opening and the second portion extends through the second opening when the fastener receiver is retained by the retainer.

15. The apparatus of claim 14, wherein the first opening of the retainer is wider than the first portion of the fastener receiver and the second opening is wider than the second portion of the fastener receiver to enable the fastener receiver to be positioned in the retainer, the first portion of the fastener receiver is wider than the second opening to enable the retainer to retain the fastener receiver.

16. The apparatus of claim 14, wherein the first opening includes a first cavity that aligns with the first flexible portion, the first cavity to receive the first protrusion of the fastener receiver, the first flexible portion to retain the first protrusion in the first cavity.

17. The apparatus of claim 16, wherein the first portion of the retainer includes a wall defining the first cavity that is to engage the first protrusion to limit rotation of the fastener receiver when the fastener receiver is retained in the retainer to enable the fastener receiver to threadably receive a fastener.

18. The apparatus of claim 16, wherein the fastener receiver includes a second protrusion spaced apart from the first protrusion, the second portion of the retainer includes a second flexible portion spaced apart from the first flexible portion, and the first opening defined by the first portion of the retainer includes a second cavity spaced apart from the first cavity, the second flexible portion is to deflect to receive and retain the second protrusion in the second cavity.

19. An apparatus comprising:
means for retaining a nut adjacent an object, the means for retaining including:
means for containing the nut adjacent the object; and
means for deflecting coupled to the means for containing, the means for deflecting to deflect in a first direction to enable the means for containing to receive the nut, the means for deflecting to deflect in a second direction opposite the first direction to enable removal of the nut from the means for containing.

20. The apparatus of claim 19, wherein the means for containing includes means for limiting rotation of the nut to enable the nut to threadably receive a fastener when retained in the means for retaining.

* * * * *